United States Patent
Woo et al.

(10) Patent No.: US 9,904,626 B2
(45) Date of Patent: Feb. 27, 2018

(54) SEMICONDUCTOR DEVICE, SEMICONDUCTOR SYSTEM AND SYSTEM ON CHIP

(71) Applicants: Deum-Ji Woo, Yongin-si (KR); Kwan-Ho Kim, Suwon-si (KR); Mi-Kyung Kim, Daejeon (KR); Beom-Woo Lee, Seoul (KR)

(72) Inventors: Deum-Ji Woo, Yongin-si (KR); Kwan-Ho Kim, Suwon-si (KR); Mi-Kyung Kim, Daejeon (KR); Beom-Woo Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 192 days.

(21) Appl. No.: 14/792,156

(22) Filed: Jul. 6, 2015

(65) Prior Publication Data
US 2016/0062913 A1    Mar. 3, 2016

Related U.S. Application Data

(60) Provisional application No. 62/043,595, filed on Aug. 29, 2014.

(30) Foreign Application Priority Data

Oct. 22, 2014    (KR) .......................... 10-2014-0143553

(51) Int. Cl.
*G06F 12/08*      (2016.01)
*G06F 12/0893*    (2016.01)
*G06F 12/0891*    (2016.01)

(52) U.S. Cl.
CPC ...... *G06F 12/0893* (2013.01); *G06F 12/0891* (2013.01)

(58) Field of Classification Search
CPC .......................... G06F 12/0891; G06F 12/0893
See application file for complete search history.

(56) References Cited

U.S. PATENT DOCUMENTS 6,587,922 B2    7/2003   Higuchi et al.
7,788,423 B2    8/2010   Daly, Jr. et al.
(Continued)

FOREIGN PATENT DOCUMENTS

JP         05307518 A     11/1993
JP       2004-258935 A     9/2004
(Continued)

OTHER PUBLICATIONS

Sandhya et al., "Nitride Engineering and the Effect of Interfaces on Charge Trap Flash Performance and Reliability", Dec. 3, 2008, IEEE, pp. 406-411.*

*Primary Examiner* — Aracelis Ruiz
(74) *Attorney, Agent, or Firm* — Harness, Dickey & Pierce, P.L.C.

(57) ABSTRACT

At least one example embodiment discloses a semiconductor device including a direct memory access (DMA) system configured to directly access a memory to write first data to an address of the memory, wherein the DMA system includes an initializer configured to set a data transfer parameter for writing the first data to the memory during a flushing period of second data from a cache to the address by a processor, a creator configured to create the first data based on the set data transfer parameter, and a transferer configured to write the first data to the address of the memory after the flushing period based on the data transfer parameter.

20 Claims, 18 Drawing Sheets

(56) References Cited

U.S. PATENT DOCUMENTS

| | | |
|---|---|---|
| 7,937,536 B2 | 5/2011 | Klaiber et al. |
| 2005/0138232 A1 | 6/2005 | Tamura et al. |
| 2008/0005465 A1* | 1/2008 | Matthews ............. G06F 3/0619 711/113 |
| 2008/0104328 A1 | 5/2008 | Yoshikawa et al. |
| 2009/0276571 A1 | 11/2009 | Benner et al. |
| 2011/0161784 A1* | 6/2011 | Selinger ............. G06F 11/1068 711/103 |
| 2014/0052955 A1 | 2/2014 | Moll et al. |
| 2014/0115265 A1 | 4/2014 | Chirca et al. |

FOREIGN PATENT DOCUMENTS

| | | | |
|---|---|---|---|
| JP | 2004258935 A | * | 9/2004 |
| JP | 2008-009857 A | | 1/2008 |

* cited by examiner

600

1200

1300

1400

SEMICONDUCTOR DEVICE, SEMICONDUCTOR SYSTEM AND SYSTEM ON CHIP

CROSS-REFERENCE TO RELATED APPLICATION

This application claims priority to Provisional Application No. 62/043,595 filed on Aug. 29, 2014 and from Korean Patent Application No. 10-2014-0143553 filed on Oct. 22, 2014 in the Korean Intellectual Property Office, and all the benefits accruing therefrom under 35 U.S.C. § 119, the contents of which in its entirety are herein incorporated by reference.

BACKGROUND

1. Field

At least some example embodiments relate to a semiconductor device, a semiconductor system and a system on chip.

2. Description of the Related Art

A direct memory access (DMA) method is a data transfer method in which a controller of an input/output (I/O) device controls data transfer from a peripheral device to a main memory without executing a program using a central processing unit (CPU). The DMA method can increase the data input/output speed and can reduce a speed difference between the CPU and the peripheral device. If the input/output device requests a DMA, the CPU hands over the control of the main memory. The CPU may permit this operation whenever a cycle of the CPU is finished.

However, when updated data is to be transferred to a particular address of a system memory using a peripheral device processing unit having a built-in DMA, the existing data received from the particular address of the system memory and stored in a cache is not effective, so that the cache is first invalidated (e.g., flushed) to start a DMA function.

SUMMARY

At least some example embodiments provide a semiconductor device, which can improve the overall performance by performing a DMA function while invalidating (i.e., flushing) a cache.

At least some example embodiments also provide a semiconductor system, which can improve the overall performance by performing a DMA function while invalidating (i.e., flushing) a cache.

At least some example embodiments also provide a system on chip, which can improve the overall performance by performing a DMA function while invalidating (i.e., flushing) a cache.

These and other objects of example embodiments will be described in or be apparent from the following description of at least some example embodiments.

According to at least one example embodiment, there is provided a semiconductor device comprising a direct memory access (DMA) system configured to directly access a memory to write first data to an address of the memory, wherein the DMA system includes an initializer configured to set a data transfer parameter for writing the first data to the memory during a flushing period of second data from a cache to the address by a processor, a creator configured to create the first data based on the set data transfer parameter, and a transferer configured to write the first data to the address of the memory after the flushing period based on the data transfer parameter.

The first data is different from the second data.

The creator is configured to receive the first data from an external device or directly create the first data.

The creator is configured to perform at least one of a read operation and a write operation on the external device.

The semiconductor device further comprises a buffer configured to store the first data.

The creator is configured to store the first data in the buffer.

The transferer is configured to transfer the first data stored in the buffer to the memory.

The data transfer parameter includes a size of the first data, an address of the buffer storing the first data, and the address of the memory.

The initializer is configured to receive information related to the data transfer parameter and information related to flushing of the cache from the processor.

The transferer is configured to receive the information related to the flushing of the cache from the initializer and be disabled during the flushing period.

The transferer is configured to operate after the flushing period.

The transferer is configured to receive information related to flushing of the cache from the processor.

The transferer is configured to receive information related to flushing of the cache from the cache.

The processor includes a central processing unit (CPU).

The memory includes DRAM.

The creator is configured to create the first data after the initializer sets the data transfer parameter.

The creator is configured to create the first data during the flushing period.

The transferer is configured to transfer the first data to the address of the memory after the creator creates the first data.

The creator is configured to perform at least one of a read operation and a write operation on the memory.

The semiconductor device further comprises a buffer configured to store the first data, wherein the first data includes third data and fourth data.

The address of the memory includes a first address and a second address, the transferer is configured to perform a first transfer of transferring the third data to the first address and a second transfer of transferring the fourth data to the second address after the first transfer, and the first transfer is performed while the creator creates the fourth data.

The creator is configured to create the third data during the flushing period and create the fourth data after the flushing period.

According to at least one example embodiment, there is provided a semiconductor device including a direct memory access (DMA) system configured to directly access a memory, and a buffer configured to store first data and second data to be transferred to the memory, wherein the DMA system includes, an initializer configured to set a data transfer parameter for transferring the first data and the second data to the memory during a flushing period of third data from a cache to a first address of the memory, a creator configured to sequentially perform a first creation and a second creation, the creator configured to perform the first creation by creating the first data based on the data transfer parameter and storing the first data in the buffer during the flushing period and the creator configured to perform the second creation by creating the second data and storing the second data in the buffer, and a transferer configured to sequentially perform a first transfer and a second transfer, the transferer configured to perform the first transfer such that the first data stored in the buffer is transferred to the first address of the memory after the flushing period and during the second creation based on the data transfer parameter, and the transferer configured to perform the second transfer such that the second data stored in the buffer is transferred to a second address of the memory.

The creator is configured to perform the first creation after the initializer completes the setting of the data transfer parameter.

The transferer is configured to perform the second transfer after the second creation is completed.

According to at least one example embodiment, there is provided a semiconductor system including a cache connected to a memory through a bus, a first processor configured to flush first data stored in the cache to an address of the memory during a flushing period, and a second processor configured to create second data different from the first data and transfer the second data to the address of the memory, wherein the second processor includes, a buffer configured to store the second data, and a direct memory access (DMA) system configured to set a data transfer parameter for transferring the second data to the memory during the flushing period and transferring the second data stored in the buffer to the address of the memory based on the data transfer parameter after the flushing period.

The first processor is configured to perform at least one of a read operation and a write operation on the cache.

The DMA system comprises an initializer configured to set a data transfer parameter for transferring the second data to the memory, a creator configured to create the second data to be transferred to the memory based on the data transfer parameter, and a transferer configured to transfer the second data to the address of the memory based on the data transfer parameter.

The initializer is configured to receive information related to the data transfer parameter and information related to flushing of the cache from the processor.

The first and second processors are connected to each other through the bus.

According to at least one example embodiment, there is provided a semiconductor system including a cache connected to a memory through a bus, a first processor configured to flush first data stored in the cache to an address of the memory during a flushing period, and a second processor configured to create second data different from the first data and transfer the second data to the address of the memory through the bus, wherein the second processor includes, a buffer configured to store the second data, and a direct memory access (DMA) system configured to transfer the second data stored in the buffer to the address of the memory, and wherein the DMA system includes an initializer configured to set a data transfer parameter for transferring the second data to the memory during the flushing period and receive information related to the data transfer parameter and information related to the flushing of the cache from the first processor, a creator configured to create the second data to be transferred to the memory based on the data transfer parameter and store the second data in the buffer, and a transferer configured to transfer the second data stored in the buffer to the address of the memory after the flushing period based on the data transfer parameter.

According to at least one example embodiment, there is provided a semiconductor system including a cache connected to a memory through a bus, a first processor configured to flush first data stored in the cache to an address of the memory during a flushing period, a second processor including a first buffer configured to store second data different from the first data, and a third processor including a direct memory access (DMA) system configured to directly access the memory, wherein the second processor is configured to create the second data and store the second data in the first buffer, and the DMA system includes, an initializer configured to set a data transfer parameter for transferring the second data to the memory during the flushing period, a creator configured to receive the second data stored in the first buffer based on the data transfer parameter, and a transferer configured to transfer the second data to the address of the memory after the flushing period based on the data transfer parameter.

The initializer is configured to receive information related to the data transfer parameter and information related to the flushing of the cache from the first processor.

The third processor further comprises a second buffer configured to store the received second data.

The creator is configured to store the second data received from the first buffer in the second buffer.

The transferer is configured to transfer the second data stored in the second buffer to the address of the memory.

The creator is configured to receive the second data after the setting of the data transfer parameter.

The second processor is configured to create the second data and store the second data in the first buffer during the flushing period.

The creator unit is configured to receive the second data during the flushing period.

The transferer is configured to transfer the second data to the address after the creator receives the second data.

The first to third processors are connected to one another through a bus.

The third processor is configured to receive the data transfer parameter from the initializer and create the second data based on the data transfer parameter.

According to at least one example embodiment, there is provided a system on chip comprising a memory, a cache connected to the memory, a first processor configured to flush first data stored in the cache to an address of the memory during a flushing period, a second processor including a first buffer configured to store second data different from the first data, and a third processor including a direct memory access (DMA) system configured to directly access the memory, wherein the memory and the first to third processors are connected to one another through a bus complying with the AMBA advanced eXtensible interface (AXI) protocol, the second processor is configured to create the second data and store the second data in the first buffer, and the DMA system includes, an initializer configured to set a data transfer parameter for transferring the second data to the memory during the flushing period, a creator configured to receive the second data stored in the first buffer based on the data transfer parameter, and a transferer configured to transfer the second data to the address of the memory after the flushing period based on the data transfer parameter.

At least one example embodiment discloses a memory system including a memory, a processor configured to flush first data in a cache to an address of the memory during a flushing period, a direct memory access system, the direct memory access system including an initializer configured to operate during the flushing period and create second data, and a transferer configured to transfer the second data to the address of the memory outside of the flushing period.

In an example embodiment, the initializer is configured to generate a data transfer parameter during the flushing period and the transferer is configured to transfer the second data based on the data transfer parameter.

In an example embodiment, the transferer is configured to transfer the second data to the address after the flushing period.

In an example embodiment, the memory system is configured to disable the transferer before the flushing period.

In an example embodiment, the memory system is configured to enable the transferer when the flushing period ends.

In an example embodiment, the memory comprises a three-dimensional memory array.

In an example embodiment, the three-dimensional memory comprises a non-volatile memory that is monolithically formed in one or more physical levels of memory cells having active areas disposed above a silicon substrate.

In an example embodiment, the three dimensional memory array comprises a plurality of memory cells, each of the memory cells including a charge trap layer.

In an example embodiment, at least one of word lines and bit lines in the three-dimensional memory array are shared between levels.

BRIEF DESCRIPTION OF THE DRAWINGS

The above and other features and advantages of example embodiments will become more apparent by describing in detail at least some example embodiments thereof with reference to the attached drawings in which.

DETAILED DESCRIPTION OF EXAMPLE EMBODIMENTS

Figure 1:
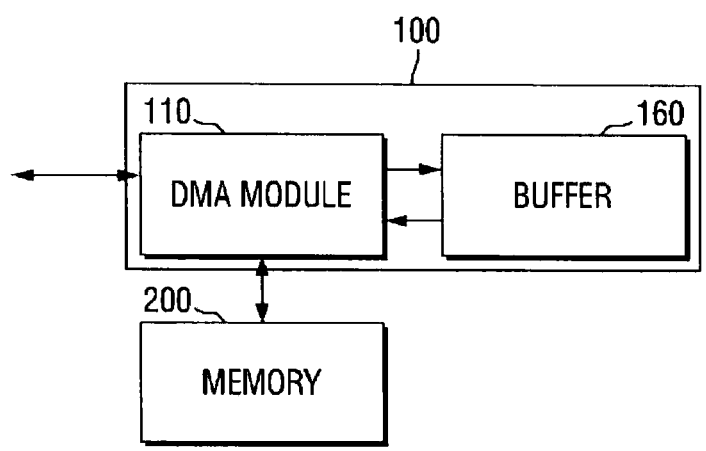
FIG. 1 is a block diagram of a semiconductor device according to an embodiment.

Advantages and features of inventive concepts and methods of accomplishing the same may be understood more readily by reference to the following detailed description of example embodiments and the accompanying drawings. Inventive concepts may, however, be embodied in many different forms and should not be construed as being limited to the embodiments set forth herein. Rather, example embodiments are provided so that this disclosure will be thorough and complete and will fully convey the concept of inventive concepts to those skilled in the art, and inventive concepts will only be defined by the appended claims. Like reference numerals refer to like elements throughout the specification.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a semiconductor device according to an example embodiment will be described with reference to FIGS. 1 to 4.

Figure 2:
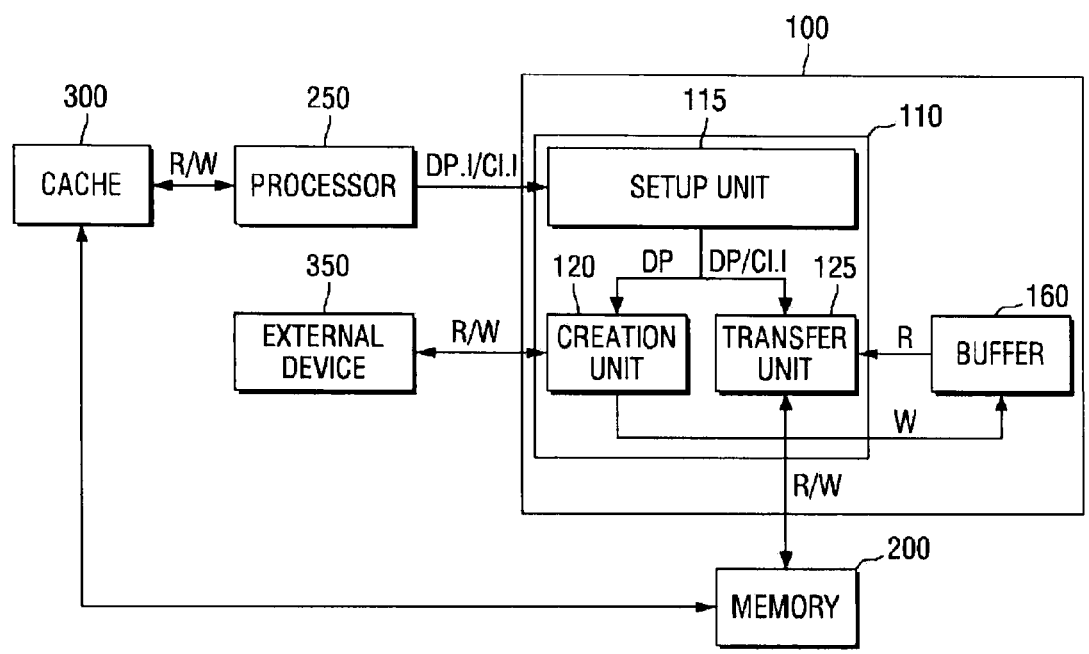
FIG. 2 is a block diagram of a DMA module shown in FIG. 1.
Figure 3:
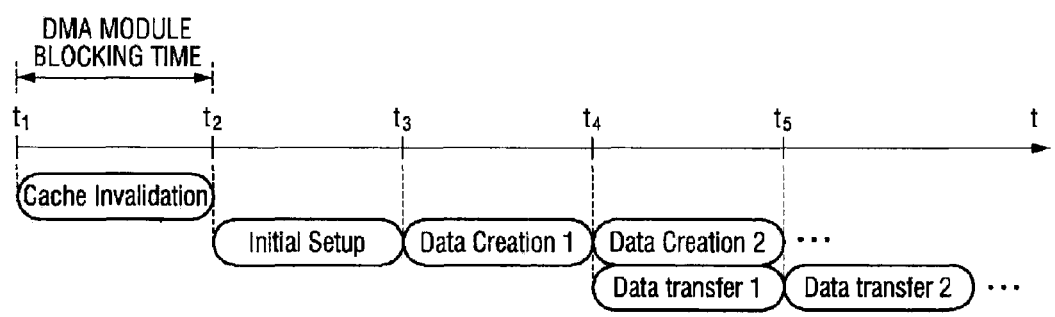
FIGS. 3 and 4 are schematic diagrams for explaining an operation of the semiconductor device shown in FIG. 1.
Figure 4:
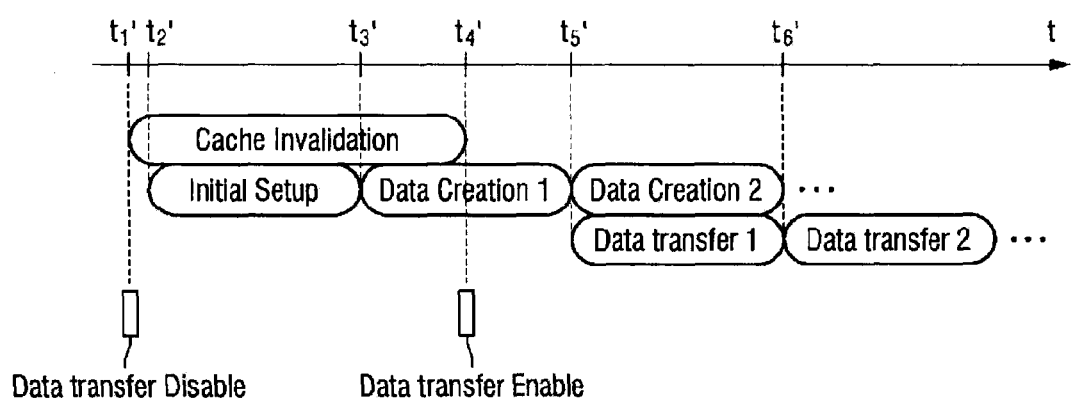

FIG. 1 is a block diagram of a semiconductor device according to at least one example embodiment, FIG. 2 is a block diagram of a DMA module shown in FIG. 1, and FIGS. 3 and 4 are schematic diagrams for explaining an operation of the semiconductor device shown in FIG. 1.

As used herein, the "unit" or "module" refers to a software element configured to be executed by a hardware element such as a processor or a hardware element, such as a Field Programmable Gate Array (FPGA) or an Application Specific Integrated Circuit (ASIC), which performs a predetermined and/or desired function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

When a module is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the module. As stated above, CPUs, DSPs, ASICs and FPGAs may generally be referred to as processing devices.

In the event where a module is a processor executing software, the processor is configured as a special purpose machine to execute the software, stored in a storage medium, to perform the functions of the module.

Referring to FIG. 1, the semiconductor device 100 may include a DMA module 110 and a buffer 160.

The DMA module 110 may directly access the memory 200.

In detail, the DMA module 110 may directly create data or may receive data from an external device to store the same in the buffer 160 and may transmit the data stored in the buffer 160 to the memory 200.

In addition, the DMA module 110 may perform a read operation or a write operation on the memory 200.

The buffer 160 may store the data received from the DMA module 110. Here, when the DMA module 110 transfers data, a bus (not shown) may not be occupied. Accordingly, the buffer 160 may have a size large enough to allow the DMA module 110 to operate without deterioration in performance.

In detail, the buffer 160 may have a reserve area larger than the maximum amount of data that can be transferred from the DMA module 110 to the memory 200 at once.

Additionally, the memory 200 may include, for example, a DRAM, but example embodiments are not limited thereto. In addition, the memory 200 may include a data area in which ordinary data is stored and a sphere area. The respective areas of the memory 200 may include a plurality of memory blocks.

The non-volatile memory may be a two-dimensional (2D) or three dimensional (3D) memory array. A 3D memory array is monolithically formed in physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

The 3D memory array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Patent Application Publication No. 2011/0233648.

A further detailed configuration of the memory 200 is known to those skilled in the art and a detailed description thereof will not be given.

Referring to FIG. 2, the DMA module 110 may include a setup unit (initializer) 115, a creation unit (creator) 120 and a transfer unit (transferer) 125.

The setup unit 115 may set a data transfer parameter DP for writing first data to the memory 200.

In detail, the setup unit 115 may receive information related to the data transfer parameter DP (DP.I) from a processor 250, and may set the data transfer parameter DP. Here, the data transfer parameter DP may include, for example, a size of the first data to be transferred to the memory 200, an address of the buffer 160 in which the first data to be transferred to the memory 200 is stored, and a predetermined and/or selected address of the memory 200 to which the first data is to be transferred, but example embodiments are not limited thereto. The first data is data to be transferred to the memory 200.

Here, the processor 250 may include, for example, a central processing unit (CPU), but example embodiments are not limited thereto. In addition, the first data may include updated data to be stored in a predetermined and/or selected address of the memory 200.

The setup unit 115 may receive the data transfer parameter related information (DP.I) and cache invalidation (to be also referred to as flush) related information (CI.I) from the processor 250 and may start to set the data transfer parameter DP based on the received cache flushing related information (CI.I). That is to say, the data transfer parameter DP may be set based on the data transfer parameter related information (DP.I) received from the processor 250 and a start time of the setting operation may be determined based on the cache flushing related information (CI.I) received from the processor 250.

In the illustrated example embodiment, the cache flushing related information (CI.I) is provided from the processor 250 to the setup unit 115, but example embodiments are not limited thereto. In more detail, the cache flushing related information (CI.I) provided first from the processor 250 to the setup unit 115 and then from the setup unit 115 to the transfer unit 125 is illustrated, but example embodiments are not limited thereto. That is to say, the cache flushing related information (CI.I) may also be provided from the processor 250 directly to the transfer unit 125 without passing through the setup unit 115, and once the flushing of the cache 300 starts, the cache 300 may create the cache flushing related information (CI.I) in itself and may provide the same to the transfer unit 125. However, for the sake of convenience, in the following description, it is assumed by way of example that the cache flushing related information (CI.I) is provided from the processor 250 to the setup unit 115.

The setup unit 115 setting the data transfer parameter DP is performed while the processor 250 flushes second data stored in the cache 300 to the predetermined and/or selected address of the memory 200. Here, the second data is existing data (that is, non-updated data), which is different from the first data that is updated data. In addition, the processor 250 may perform a read operation or a write operation on the cache 300 in addition to the flushing of the cache 300.

The setup unit 115 may provide the set data transfer parameter DP to the creation unit 120 and the transfer unit 125. In addition, the setup unit 115 may provide the cache flushing related information (CI.I) to the transfer unit 125, which will later be described in more detail.

The creation unit 120 may create the first data to be transferred to the memory 200 based on the set data transfer parameter DP.

In detail, the creation unit 120 may receive the data transfer parameter DP from the setup unit 115 and may create the first data based on the data transfer parameter DP. Here, the expression "the creation unit 120 creates data" may mean that the creation unit 120 may receive (read) the data from an external device 350 or may directly create the data in itself. In addition, the creation unit 120 may store (write) the created first data in the buffer 160.

Here, the external device 350 may include, for example, a multi-media card (MMC), but example embodiments are not limited thereto.

That is to say, the creation unit 120 creates the first data according to the data size, pointed by the data transfer parameter DP and may store the created first data in the address of the buffer 160, pointed by the data transfer parameter DP.

The creation unit 120 may perform a read operation or a write operation on the external device 350. As described above, the creation unit 120 may receive (read) the first data from the external device 350 to create the first data. In addition to the read operation, the creation unit 120 may also perform the data write operation on the external device 350.

The transfer unit 125 may write the first data to the predetermined and/or selected address of the memory 200 based on the data transfer parameter DP.

In detail, the transfer unit 125 may receive the data transfer parameter DP from the setup unit 115 or may transfer the first data to the predetermined and/or selected address of the memory 200 based on the data transfer parameter DP. Here, the transfer unit 125 may transfer the first data stored in the buffer 160 to the memory 200.

That is to say, the transfer unit 125 may read the first data stored in the address of the buffer 160, pointed by the data transfer parameter DP, and may transfer (write) the first data to the predetermined and/or selected address of the memory 200, pointed by the data transfer parameter DP.

The transfer unit 125 may transfer the first data to the predetermined and/or selected address of the memory 200 after the flushing of the cache 300 is completed.

In addition, the transfer unit 125 may receive the flush related information (CI.I) of the cache 300 (e.g., information signaling that flushing the cache 300 starts) from the setup unit 115 to then be disabled while the cache 300 is flushed. Here, the transfer unit 125 may be disabled in all cases of before the flushing of the cache 300 starts, at the same time when the flushing of the cache 300 starts or after the flushing of the cache 300 starts.

After the flushing of the cache 300 is completed, the transfer unit 125 may receive the flush related information (CI.I) of the cache 300 (e.g., information signaling that flushing of the cache 300 is completed) from the setup unit 115 to then be enabled.

The transfer unit 125 may perform a read operation or a write operation on the memory 200. As described above, the transfer unit 125 may transfer (write) the first data to the predetermined and/or selected address of the memory 200. In addition to the write operation, the transfer unit 125 may also perform the data read operation from the memory 200.

Referring to FIGS. 2 and 3, an operation of the DMA module starts after an invalidation operation (that is, a flushing) of a cache is completed. Specifically, FIG. 3 illustrates a case in which the semiconductor device 100 according to an example embodiment is not applied.

That is to say, in a cache invalidation period in which the processor flushes the cache (corresponding to a time period ranging from $t_1$ to $t_2$), the operation of the DMA module may be blocked. If the operation of the DMA module is not blocked during the cache flushing period ($t_1$ to $t_2$), the data flushed by the cache (that is, non-updated data or existing data) may be overwritten on top of the updated data that is to be transferred by the DMA module in a case where an address of the memory to which the cache is flushed and an address of the memory to which the DMA module intends to transfer data are the same with each other.

Accordingly, the DMA function may be blocked during the cache flushing period ($t_1$ to $t_2$), and an initial setup operation of the DMA module (that is, an operation of the setup unit setting the data transfer parameter) may start from a time $t_2$ at which the flushing of the cache is completed.

If the initial setup operation of the DMA module is completed at a time $t_3$, a first data creation operation (Data Creation 1) (that is, an operation of the creation unit creating first data) may start from the time $t_3$.

In addition, if the first data creation operation (Data Creation 1) is completed at a time $t_4$, a second data creation operation (Data Creation 2) (that is, an operation of the creation unit creating second data that is updated data, which is different from the first data) and a first data transfer operation (Data transfer 1) (that is, an operation of the transfer unit transferring the first data to the memory) may simultaneously start from the time $t_4$. That is to say, the operations of the transfer unit and the creation unit of the DMA module may be performed in a pipelined manner.

Next, if the second data creation operation (Data Creation 2) and the first data transfer operation (Data transfer 1) are completed at a time $t_5$, a second data transfer operation (Data transfer 2) (that is, an operation of the transfer unit transferring the second data to the memory) may start at the time $t_5$.

Here, an address of the memory to which the second data is transferred and an address of the memory to which the first data is transferred may be different from each other.

As shown in FIG. 3, it is possible to prevent the data flushed by the cache (that is, non-updated data or existing data) from being overwritten on top of the updated data, but an execution time of the DMA module may be extended by a flushing time of the cache (Cache Invalidation), thereby lowering the overall performance.

Meanwhile, referring to FIGS. 2 and 4, an operation of the DMA module and an invalidation operation (that is, a flushing) of a cache simultaneously start. Specifically, FIG. 4 illustrates a case in which the semiconductor device 100 is applied.

The following description will focus on differences between the cases shown in FIGS. 3 and 4.

That is to say, in a cache invalidation period in which the processor flushes the cache (Cache Invalidation) corresponding to a time period ranging from $t_1$ to $t_2$, unlike in FIG. 3, the operation of the DMA module is not blocked.

In detail, the transfer unit of the DMA module is disabled (Data Transfer Disable) at the same time when the flushing of the cache starts at a time $t_1'$. As described above, the transfer unit of the DMA module may be disabled before the flushing of the cache starts, at the same time when the flushing of the cache starts or after the flushing of the cache starts. For the sake of convenience, however, the following description will be made with regard to the case of FIG. 4 in which the transfer unit of the DMA module is disabled at the same time when the flushing of the cache starts.

Here, the disable period of the transfer unit may be continued up to a time $t_4'$, that is, up to a time when the flushing of the cache is completed. This is for the purpose of preventing the data flushed by the cache (that is, non-updated data or existing data) from being overwritten on top of the updated data.

An initial setup operation of the DMA module (that is, an operation of the setup unit setting the data transfer parameter DP) may start at a time $t_2'$ a little after the time $t_1'$ at which the flushing of the cache starts.

That is to say, the operation of the DMA module 110 may be performed during a period in which the cache 300 is flushed. Accordingly, unlike in FIG. 3, an execution time of the DMA module may be extended by a flushing time of the cache 300 (Cache Invalidation).

If the initial setup operation of the DMA module 110 is completed at a time $t_3'$, a first data creation operation (Data Creation 1) (that is, an operation of the creation unit creating first data) may start from the time $t_3'$. Here, the first data creation operation (Data Creation 1) and the flushing time of the cache 300 may be pipelined.

In detail, the first data creation operation (Data Creation 1) starts during the flushing time of the cache 300 (that is, between $t_1'$ and $t_4'$) and may be completed before the flushing of the cache 300 is completed, at the same time when the flushing of the cache 300 is completed or after the flushing of the cache 300 is completed.

In addition, if the flushing of the cache is completed at a time $t_4'$, the transfer unit of the DMA module may be enabled after the time $t_4'$ (Data transfer Enable). Accordingly, if the first data creation operation (Data Creation 1) is completed at a time $t_5'$, a second data creation operation (Data Creation 2) (that is, an operation of the creation unit creating second data different from the first data, which is updated data) and a first data transfer operation (Data transfer 1) (that is, an operation of the transfer unit transferring the first data to the memory) may simultaneously start from the time $t_5'$.

That is to say, the operations of the transfer unit 125 and the creation unit 120 of the DMA module 110 may be performed in a pipelined manner.

Next, if the second data creation operation (Data Creation 2) and the first data transfer operation (Data transfer 1) are completed at a time $t_6'$, a second data transfer operation (Data transfer 2) (that is, an operation of the transfer unit transferring the second data to the memory) may start at the time $t_6'$.

In the semiconductor device 100, the disable period of the transfer unit 125 is continued up to a time when the flushing of the cache 300 is completed, thereby preventing the data flushed by the cache (that is, non-updated data or existing data) from being overwritten on top of the updated data and expediting the execution time of the DMA module 110 by the flushing time of the cache 300, ultimately improving the overall performance.

In addition, in at least some example embodiments, the setup unit 115, the creation unit 120 and the transfer unit 125 are implemented in hardware manners, but example embodiments are not limited thereto. That is to say, the setup unit 115, the creation unit 120 and the transfer unit 125 may also be implemented in a processor configured to execute software stored in the DMA module 110 in code formats.

Hereinafter, a semiconductor system according to an example embodiment will be described with reference to FIGS. 5 and 6. In the following description, the same content with the previous example embodiment will not be repeatedly described.

Figure 5:
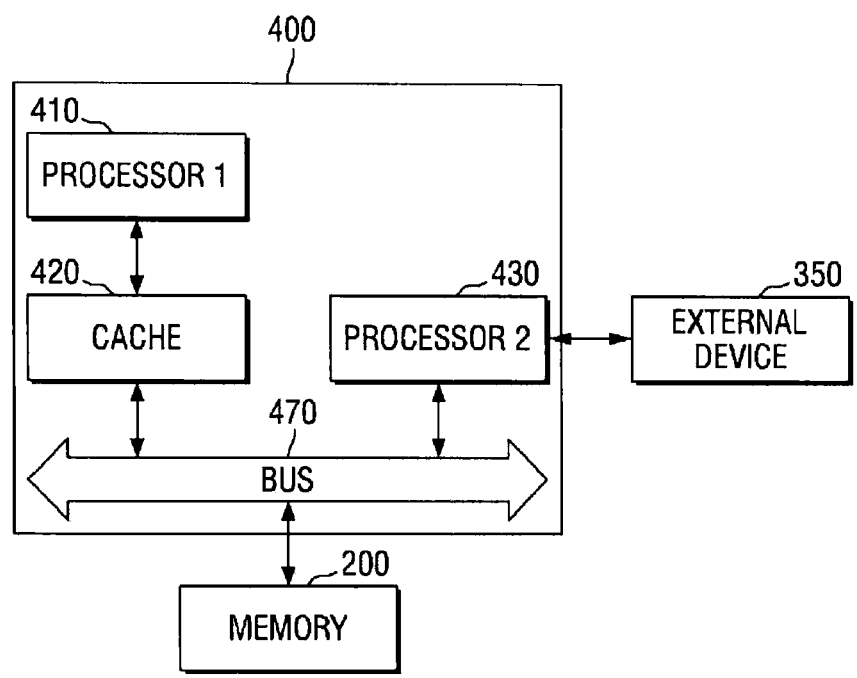
FIG. 5 is a block diagram of a semiconductor system according to an embodiment.
Figure 6:
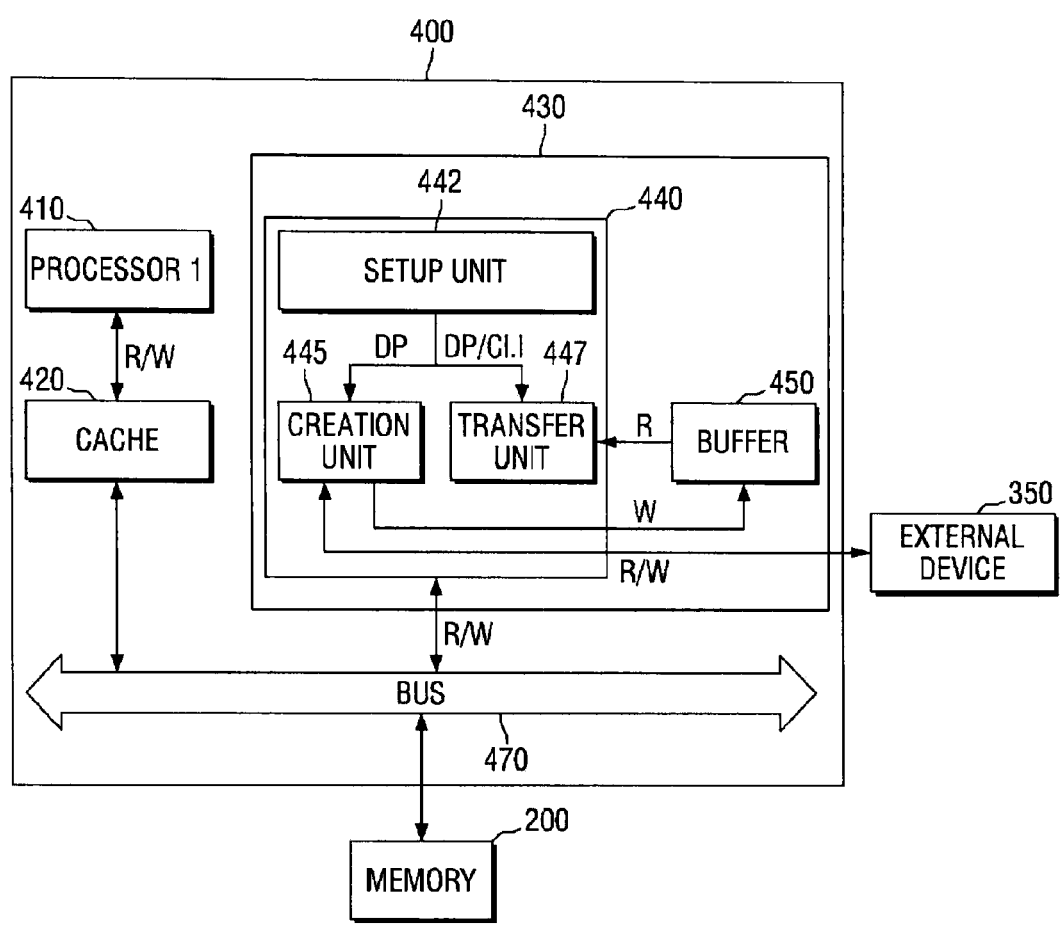
FIG. 6 is a block diagram of a second processor shown in FIG. 5.

FIG. 5 is a block diagram of a semiconductor system according to an example embodiment and FIG. 6 is a block diagram of a second processor shown in FIG. 5.

Referring to FIG. 5, the semiconductor system 400 may include a first processor 410, a cache 420, a second processor 430, and a bus 470.

The first processor 410 may flush data stored in the cache 420 (e.g., existing data, that is, non-updated data) to a predetermined and/or selected address of the memory 200.

In detail, the first processor 410 may perform a read operation or a write operation on the cache 420 in addition to the flushing of the cache 420. In addition, the first processor 410 may provide information related to the data transfer parameter DP and information related to the invalidation or flushing of the cache 420 to the second processor 430.

Here, the first processor 410 may include, for example, a central processing unit (CPU) and the memory 200 may include, for example, a DRAM, but example embodiments are not limited thereto.

The cache 420 may be flushed by the first processor 410.

In detail, the cache 420 may be flushed to a predetermined and/or selected address of the memory 200 by the first processor 410. In addition, the cache 420 may be connected to the memory 200 through the bus 470.

The second processor 430 may create data (updated data) different from the data stored in the cache 420 and may transfer the created data to the predetermined and/or selected address of the memory 200.

Here, the second processor 430 may directly create the data in itself or may receive the data from the external device 350.

The bus 470 may connect the first processor 410, the second processor 430 and the cache 420 to one another and may connect the semiconductor system 400 and the memory 200 to each other.

In detail, the first processor 410 providing the information related to the data transfer parameter DP and the information related to the invalidation or flushing of the cache 420 to the second processor 430, the cache 420 being flushed to predetermined and/or selected address of the memory 200, and the second processor 430 transferring the data to the predetermined and/or selected address of the memory 200 may all be performed through the bus 470.

Additionally, the semiconductor system 400 including the first processor 410, the cache 420, the second processor 430 and the bus 470 is illustrated in FIG. 5, but example embodiments are not limited thereto. That is to say, the semiconductor system 400 may also include a memory 200 and an external device 350.

Referring to FIG. 6, the second processor 430 may include a DMA module 440 and a buffer 450. Here, the second processor 430 may be the semiconductor device 100 shown in FIG. 2.

Therefore, the DMA module 440 may directly access the memory 200 through the bus 470.

In detail, the DMA module 440 may set a data transfer parameter DP for transferring data to the memory 200 and may create data to be transferred to the memory 200 based on the data transfer parameter DP to then store the same in the buffer 450. In addition, the DMA module 440 may transfer the data stored in the buffer 450 to the predetermined and/or selected address of the memory 200. Here, the DMA module 440 may directly create the data to be transferred to the memory 200 in itself or may receive the data from the external device 350.

In addition, the DMA module 440 may include a setup unit 442, a creation unit 445 and a transfer unit 447, which is the same as described above, and a detailed description will not be given.

Additionally, in the illustrated example embodiment, cache flushing related information (CI.I) is provided from the first processor 410 to the second processor 430 (e.g., the setup unit 442 of the second processor 430), but example embodiments are not limited thereto. In more detail, the cache flushing related information (CI.I) provided first from the first processor 410 to the setup unit 442 and then from the setup unit 442 to the transfer unit 447 is illustrated, but example embodiments are not limited thereto. That is to say, the cache flushing related information (CI.I) may also be provided from the first processor 410 directly to the transfer unit 447 through the bus 470 without passing through the setup unit 442, and once the flushing of the cache 420 starts, the cache 420 may create the cache flushing related information (CI.I) in itself and may provide the same to the transfer unit 447 through the bus 470.

Hereinafter, a semiconductor system according to another example embodiment will be described with reference to FIGS. 7 and 8. In the following description, the same content with the previous embodiments will not be repeatedly described.

Figure 7:
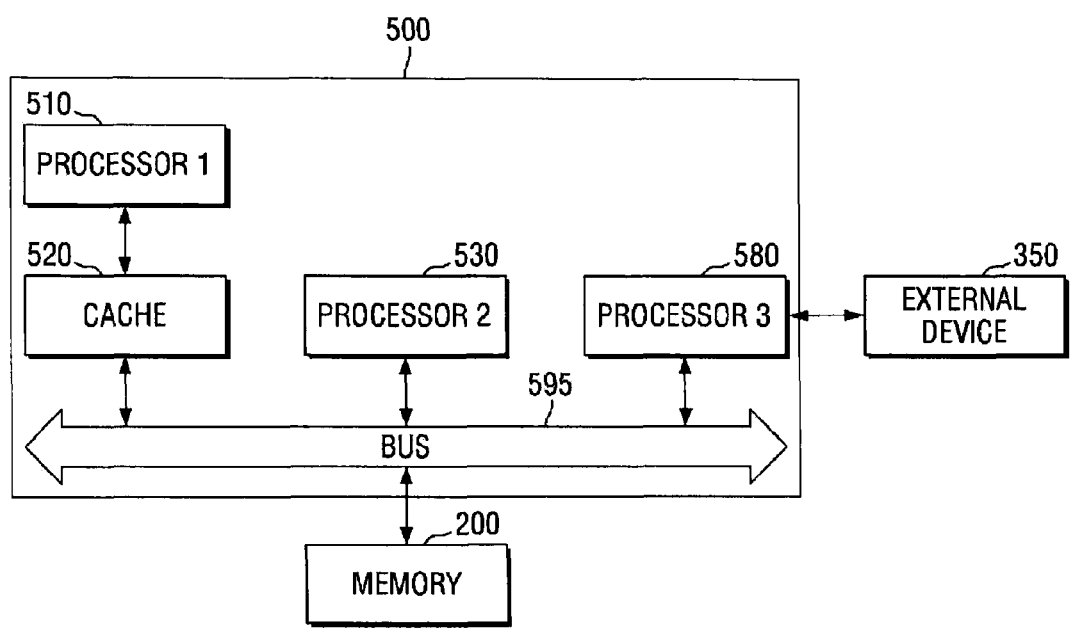
FIG. 7 is a block diagram of a semiconductor system according to another embodiment.
Figure 8:
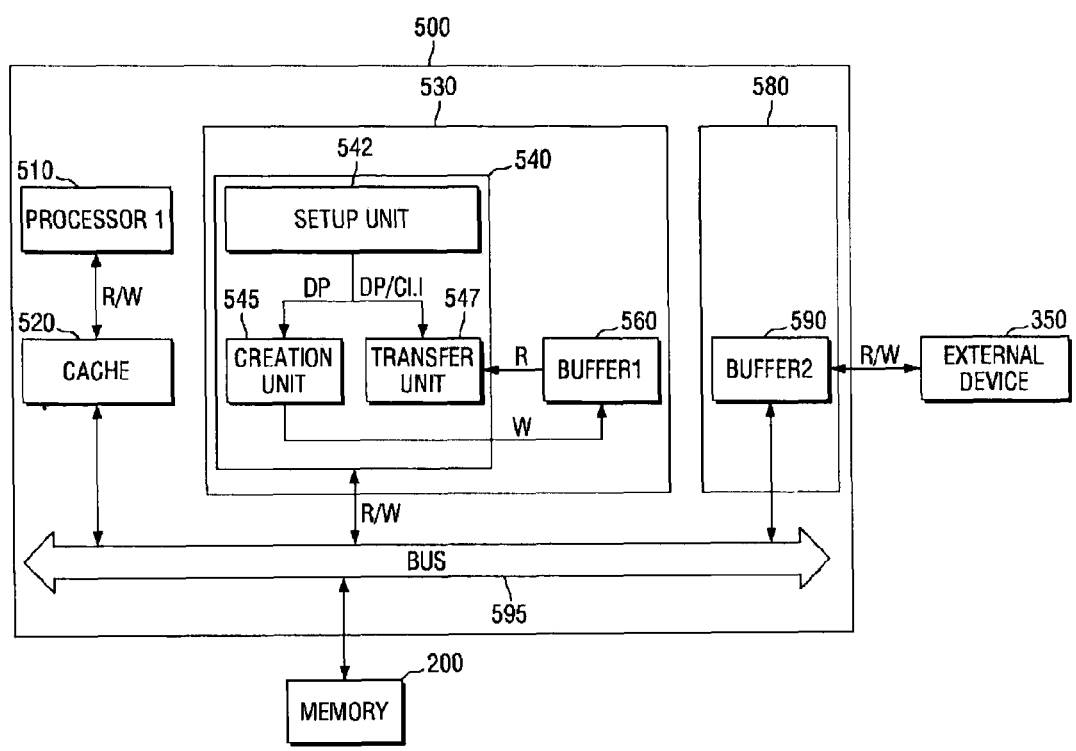
FIG. 8 is a block diagram of second and third processors shown in FIG. 7.

FIG. 7 is a block diagram of a semiconductor system according to another example embodiment and FIG. 8 is a block diagram of second and third processors shown in FIG. 7.

Referring to FIG. 7, the semiconductor system 500 may include a first processor 510, a cache 520, a second processor 530, a third processor 580 and a bus 595.

The first processor 510 may flush data stored in the cache 520 (e.g., existing data, that is, non-updated data) to a predetermined and/or selected address of the memory 200.

In detail, the first processor 510 may perform a read operation or a write operation on the cache 520 in addition to the flushing of the cache 520. In addition, the first processor 510 may provide information related to the data transfer parameter DP and information related to the invalidation or flushing of the cache 520 to the second processor 530.

Here, the first processor 510 may include, for example, a central processing unit (CPU) and the memory 200 may include, for example, a DRAM, but example embodiments are not limited thereto.

The cache 520 may be flushed by the first processor 510.

In detail, the cache 520 may be flushed to a predetermined and/or selected address of the memory 200 by the first processor 510. In addition, the cache 520 may be connected to the memory 200 through the bus 595.

The second processor 530 may transfer data (updated data) different from the data stored in the cache 520 to the predetermined and/or selected address of the memory 200.

Here, the second processor 530 may receive (that is, read) data stored in the third processor 580 and may transfer the received data to the memory 200.

The third processor 580 may receive data to be transferred to the memory 200 from an external device 350 and may store the received data.

The bus 595 may connect the first processor 510, the second processor 530, the third processor 580 and the cache 520 to one another and may connect the semiconductor system 500 and the memory 200 to each other.

In detail, the first processor 510 providing the information related to the data transfer parameter DP and the information related to the invalidation or flushing of the cache 520 to the second processor 530, the second processor 510 providing the data transfer parameter DP to the third processor 580, the second processor 530 receiving the data stored in the third processor 580, the cache 520 being flushed to predetermined and/or selected address of the memory 200, and the second processor 530 transferring the data to the predetermined and/or selected address of the memory 200 may all be performed through the bus 595.

Referring to FIG. 8, the second processor 530 may include a DMA module 540 and a first buffer 560.

In detail, the DMA module 540 may include a setup unit 542, a creation unit 545 and a transfer unit 547.

The setup unit 542 may set the data transfer parameter DP for writing first data to the memory 200.

In detail, the setup unit 542 may receive information related to the data transfer parameter DP from the first processor 510 through the bus 595 and may set the data transfer parameter DP. Here, the data transfer parameter DP may include, for example, a size of the first data to be transferred to the memory 200, an address of the first buffer 560 storing the first data to be transferred to the memory 200, an address of the second buffer 590 storing the first data to be transferred to the memory 200, and the predetermined and/or selected address of the memory 200 to which the first data is to be transferred, but example embodiments are not limited thereto. In addition, the first data may include updated data to be transferred to the memory 200.

The setup unit 542 may receive data transfer parameter related information (DP.I) and cache invalidation (to be also referred to as flush) related information (CI.I) from the processor 250 and may start to set the data transfer parameter DP based on the received cache flushing related information (CI.I). That is to say, the data transfer parameter DP may be set based on the data transfer parameter related information (DP.I) received from the first processor 510 and a start time of the setting operation may be determined based on the cache flushing related information (CI.I) received from the first processor 510.

In the illustrated example embodiment, the cache flushing related information (CI.I) is provided from the first processor 510 to the second processor 530 (e.g., the setup unit 542 of the second processor 530), but example embodiments are not limited thereto. In more detail, the cache flushing related information (CI.I) provided first from the first processor 510 to the setup unit 542 and then from the setup unit 542 to the transfer unit 547, but example embodiments are not limited thereto. That is to say, the cache flushing related information (CI.I) may also be provided from the first processor 510 directly to the transfer unit 547 through the bus 595 without passing through the setup unit 542, and once the flushing of the cache 520 starts, the cache 520 may create the cache flushing related information (CI.I) in itself and may provide the same to the transfer unit 547 through the bus 595. However, for the sake of convenience, in the following description, it is assumed by way of example that the cache flushing related information (CI.I) is provided from the first processor 510 to the setup unit 542.

The setup unit 542 setting the data transfer parameter DP may be performed while the first processor 510 flushes the second data stored in the cache 520 to the predetermined and/or selected address of the memory 200. Here, the second data may be existing data (that is, non-updated data), which is different from the first data that is updated data.

The setup unit 542 may provide the set data transfer parameter DP to the creation unit 545 and the transfer unit 547. In addition, the setup unit 542 may provide the cache flushing related information (CI.I) to the transfer unit 547.

The creation unit 545 may create the first data to be transferred to the memory 200 based on the set data transfer parameter DP.

In detail, the creation unit 545 may receive the data transfer parameter DP from the setup unit 542 or may receive the first data stored in the second buffer 590 of the third processor 580 based on the data transfer parameter DP. In addition, the creation unit 545 receiving the first data may be performed while the cache 520 is flushed.

Here, the creation unit 545 may receive data from the second buffer 590 of the third processor 580 through the bus 595 or may directly create data in itself.

In addition, the creation unit 545 may store the first data in an address of the first buffer 560, pointed by the data transfer parameter DP.

The transfer unit 547 may write the first data to the predetermined and/or selected address of the memory 200 based on the data transfer parameter DP.

In detail, the transfer unit 547 may receive the data transfer parameter DP from the setup unit 542 and may transfer the first data to the predetermined and/or selected address of the memory 200 based on the data transfer parameter DP. Here, the transfer unit 547 may transfer the first data stored in the first buffer 560 to the memory 200.

That is to say, the transfer unit 547 may read the first data stored in the address of the first buffer 560, pointed by the data transfer parameter DP, and may transfer (write) the first data to the predetermined and/or selected address of the memory 200, pointed by the data transfer parameter DP.

The transfer unit 547 transferring the first data to the predetermined and/or selected address of the memory 200 may be performed after the flushing of the cache 520 is completed.

In addition, the transfer unit 547 may receive the flush related information (CI.I) of the cache 520 (e.g., information signaling that flushing of the cache 520 starts) from the setup unit 542 to then be disabled while the cache 520 is flushed. Here, the transfer unit 547 may be disabled in all cases of before the flushing of the cache 520 starts, at the same time when the flushing of the cache 520 starts or after the flushing of the cache 520 starts.

After the flushing of the cache 520 is completed, the transfer unit 547 may receive the flush related information (CI.I) of the cache 520 (e.g., information signaling that flushing of the cache 520 is completed) from the setup unit 542 to then be enabled.

The transfer unit 547 may perform a read operation or a write operation on the memory 200. As described above, the transfer unit 547 may transfer (write) the first data to the predetermined and/or selected address of the memory 200.

In addition to the write operation, the transfer unit 547 may also perform the data read operation from the memory 200.

The third processor 580 may include a second buffer 590.

In detail, the third processor 580 may create first data and may store the created first data in the second buffer 590. That is to say, the third processor 580 may receive the data transfer parameter DP from the setup unit 542 and may receive the first data from the external device 350 based on the received data transfer parameter DP or may create the first data in itself.

That is to say, in the semiconductor system 500 shown in FIG. 8, unlike in the semiconductor system 400 shown in FIG. 6, a processor (that is, the third processor 580) receiving data from the external device 350 and a processor (that is, the second processor 530) transferring the data received from the external device 350 to the memory 200 are separately provided.

In addition, the semiconductor systems 400 and 500 shown in FIGS. 6 and 8 may be integrated into a system with the memory 200. In an example embodiment, the semiconductor system 400 or 500 and the memory 200 may be integrated into a system to constitute a memory card. The semiconductor system 400 or 500 and the memory 200 may be integrated into a system and examples thereof may include a PC card such as a personal computer memory card international association (PCMCIA) card, a compact flash (CF) card, a smart media card (e.g., SM or SMC), a memory stick, a multimedia card (e.g., MMC, RS-MMC or MMC-micro), a SD card (e.g., SD, miniSD, microSD and SDHC), or a universal flash storage (UFS).

The semiconductor system 400 or 500 and the memory 200 may be integrated into a system to constitute a solid state drive or solid state disk (SSD).

Figure 9:
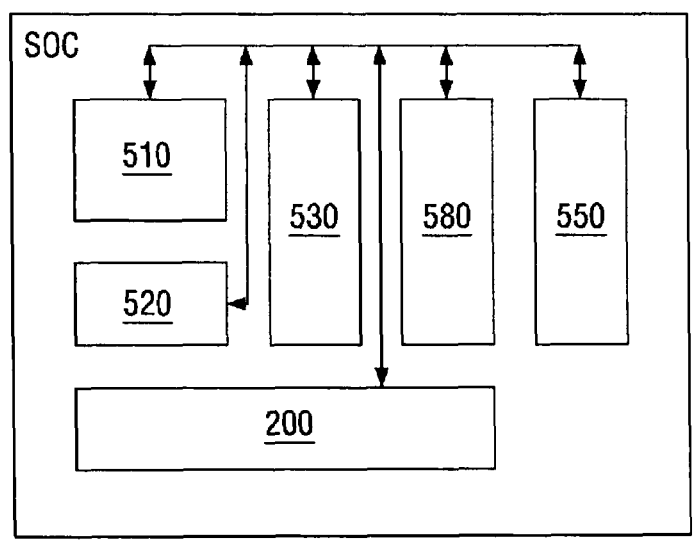
FIG. 9 is a diagram illustrating the semiconductor system shown in FIG. 7 implemented as a system on chip.

FIG. 9 is a diagram illustrating the semiconductor system shown in FIG. 7 implemented as a system on chip.

Referring to FIG. 9, the semiconductor system 500 according to another example embodiment may include a first processor 510, a cache 520, a second processor 530, and a third processor 580, which may be implemented as a system on chip (SoC) and may be connected to each other through an internal bus incorporated into the SoC, for example, a bus complying with the AMBA advanced eXtensible interface (AXI) protocol. In addition, in at least some example embodiments, the SoC may be implemented as an application processor (AP) mounted on a mobile terminal. In at least some example embodiments, the SoC may further include a memory 200 and an external memory 550.

The semiconductor system 400 shown in FIG. 5 as well as the semiconductor system 500 shown in FIG. 7 may also be implemented as system on chips (SoCs), and detailed descriptions thereof will not be given.

In addition, the semiconductor systems 400 and 500 in accordance with at least some example embodiments can be mounted with various types of packages. For example, the semiconductor systems 400 and 500 can be mounted by various types of packages such as, but not limited to, package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), system in package (SIP), multi chip package (MCP), wafer-level fabricated package (WFP), wafer-level processed stack package (WSP) and mounted.

Figure 10:
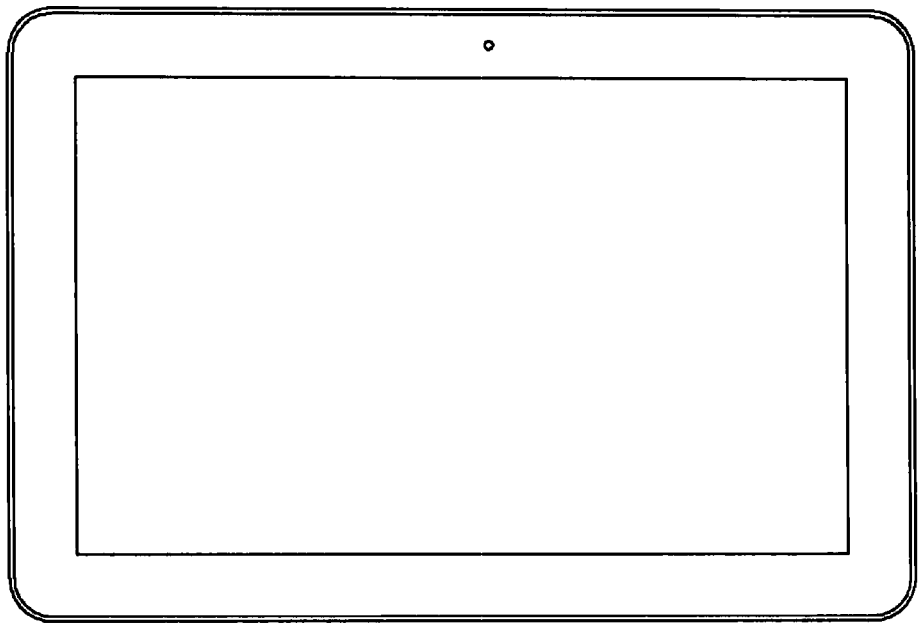
FIGS. 10 to 12 illustrate electronic systems according to at least some example embodiments to which semiconductor systems can be applied.
Figure 11:
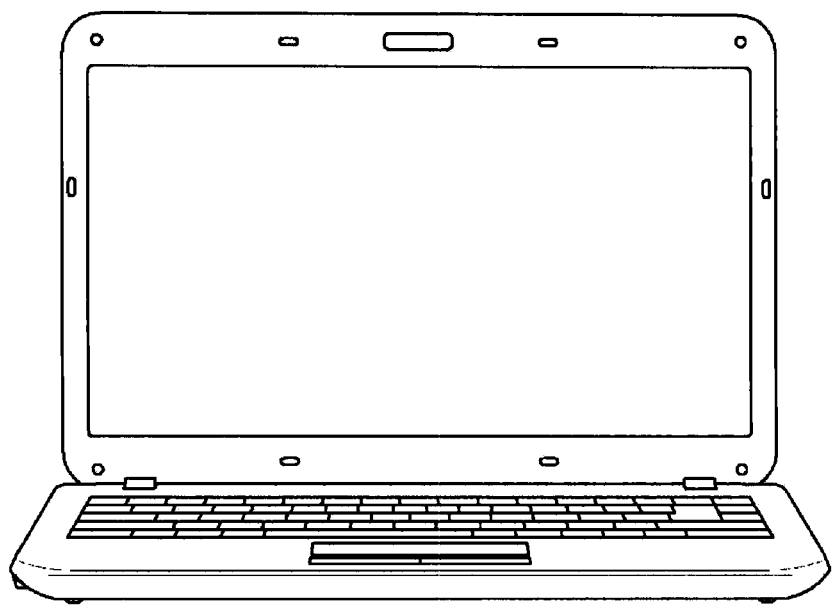
Figure 12:
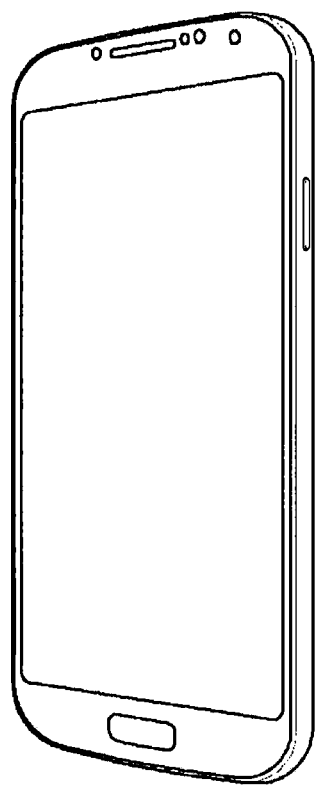

FIGS. 10 to 12 illustrate electronic systems according to at least some example embodiments to which semiconductor systems can be applied.

Specifically, FIG. 10 illustrates a tablet PC 1200, FIG. 11 illustrates a notebook computer 1300, and FIG. 12 illustrates a smart phone 1400. At least one of the semiconductor systems 400 and 500 may be used with the tablet PC 1200, the notebook computer 1300 and smart phone 1400.

In addition, it is obvious to one skilled in the art that at least one of the semiconductor systems 400 and 500 can be other integrated circuits not illustrated herein. That is to say, in the above-described example embodiments, as the at least one of the electronic systems, only the tablet PC 1200, the notebook computer 1300 and smart phone 1400 are exemplified, but example embodiments are not limited thereto. In at least some example embodiments, the electronic systems can be implemented as computers, ultra mobile personal computers (UMPCs), work stations, net-books, personal digital assistants (PDAs), portable computers, web tablets, wireless phones, mobile phones, smart phones, e-books, portable multimedia players (PMPs), portable game consoles, navigation devices, black boxes, digital cameras, 3-dimensional televisions, digital audio recorders, digital audio players, digital video recorders, digital video players, and so on.

Hereinafter, an operating method of the semiconductor device shown in FIG. 1 will be described with reference to FIGS. 13 and 14. In the following description, the same content with the example embodiment shown in FIG. 1 will not be repeatedly described.

Figure 13:
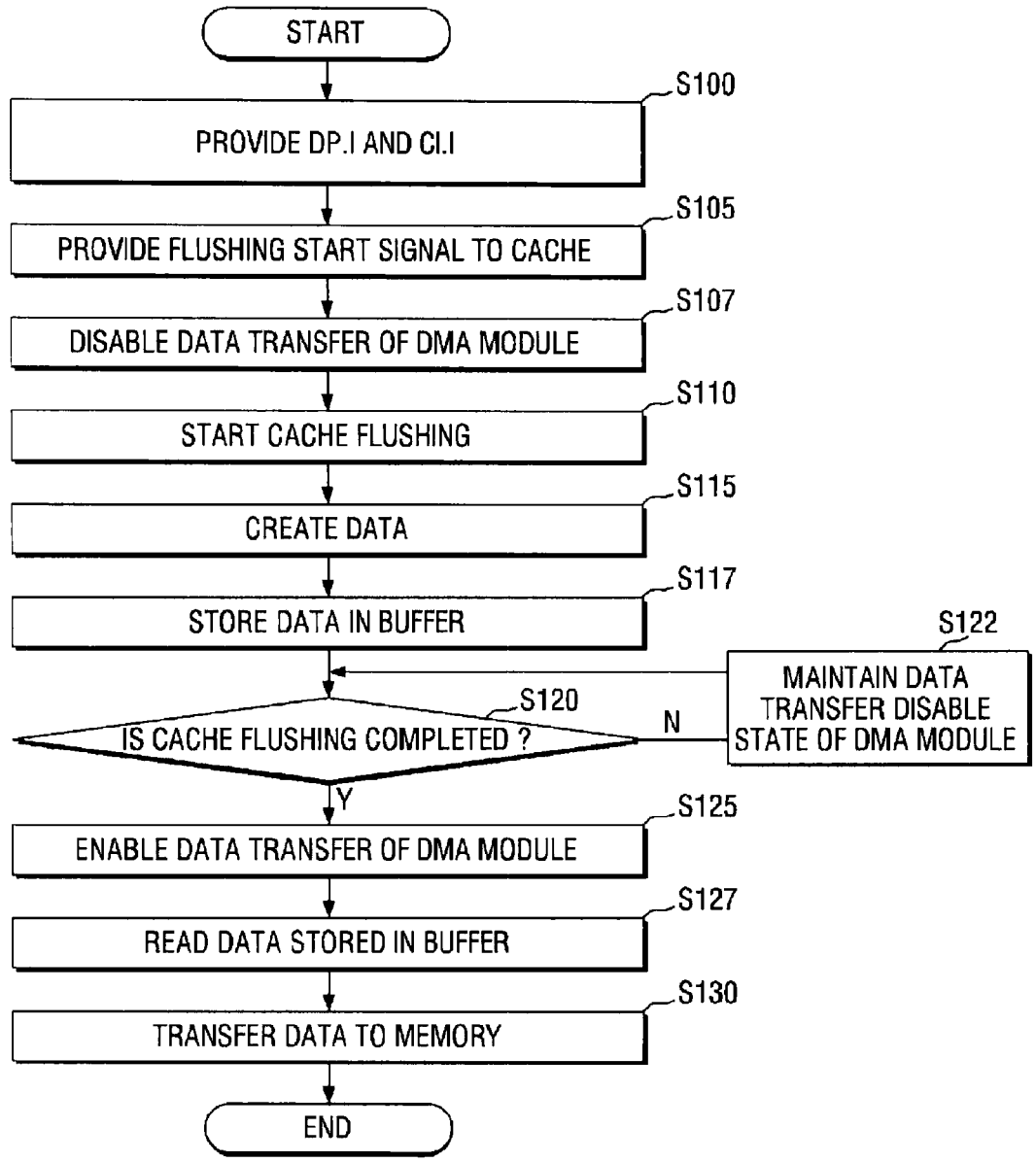
FIGS. 13 and 14 are diagrams illustrating an operating method of the semiconductor device shown in FIG. 1.
Figure 14:
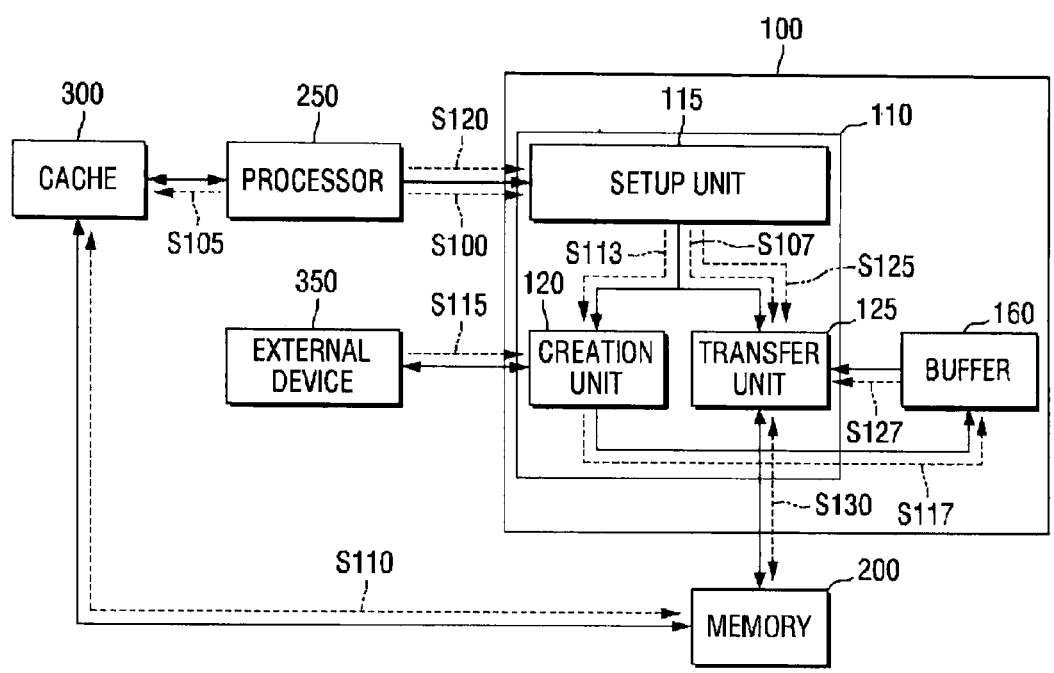

FIGS. 13 and 14 are diagrams illustrating an operating method of the semiconductor device shown in FIG. 1.

Referring to FIGS. 2, 13 and 14, first, data transfer parameter related information (DP.I) and cache flushing related information (CI.I) are provided (S100).

In detail, the setup unit 115 may receive the data transfer parameter related information (DP.I) and the cache flushing related information (CI.I) from the processor 250.

A flushing start signal is provided to the cache 300 (S105).

In detail, the processor 250 may provide an invalidating (that is, flushing) start signal to the cache 300.

A data transfer operation of the DMA module 110 is disabled (S107).

In detail, the setup unit 115 may provide cache flushing related information (CI.I) to the transfer unit 125. In addition, the transfer unit 125 may receive the cache flushing related information (CI.I) (e.g., information signaling that flushing of the cache 300 starts) to then be disabled.

The flushing of the cache 300 starts (S110).

In detail, the second data stored in the cache 300 (existing data, that is, non-updated data) may be flushed to a predetermined and/or selected address of the memory 200.

In the illustrated example embodiment, S100, S105, S107 and S110 are sequentially performed, but example embodiments are not limited thereto. That is to say, after the processor 250 provides the flushing start signal to the cache 300 (S105), the data transfer parameter related information (DP.I) and the cache flushing related information (CI.I) may be provided to the setup unit 115 (S100).

Therefore, the transfer unit 125 (S107) may be disabled in all cases of before the flushing of the cache 300 starts, at the same time when the flushing of the cache 300 starts or after the flushing of the cache 300 starts.

After the flushing of the cache 300 starts, the setup unit 115 may set the data transfer parameter DP based on the data transfer parameter related information (DP.I) received from the processor 250. In addition, the setup unit 115 may set the data transfer parameter DP and may provide the same to the creation unit 120 (S113).

Then, data is created (S115).

In detail, the creation unit 120 may create first data (that is, updated data to be transferred to a predetermined and/or selected address of the memory 200) based on the received data transfer parameter DP. The creation unit 120 may directly create the first data in itself or may receive the first data from the external device 350.

The data is stored in the buffer 160 (S117).

In detail, the creation unit 120 may store the first data in an address of the buffer 160, pointed by the data transfer parameter DP.

If the flushing of the cache 300 is completed (S120), the processor 250 may provide the cache flushing related information (CI.I) (e.g., information signaling that flushing of the cache 300 is completed) to the setup unit 115. However, if the flushing of the cache 300 is not completed, a disable state of the transfer unit 125 may be maintained (that is, a data transfer disable state of the DMA module 110 is maintained.) (S122).

A data transfer operation of the DMA module 110 is enabled (S125).

In detail, if the information signaling that flushing of the cache 300 is completed is received from the processor 250, the setup unit 115 may provide the received information to the transfer unit 125.

The transfer unit 125 may receive the information signaling that flushing of the cache 300 is completed to then be enabled.

The data stored in the buffer 160 is read (S127).

In detail, the transfer unit 125 may read the first data stored in the buffer 160 based on the data transfer parameter DP.

The data is transferred to the memory 200 (S130).

In detail, the transfer unit 125 may transfer the first data to the predetermined and/or selected address of the memory 200 based on the data transfer parameter DP.

Hereinafter, an operating method of the semiconductor system shown in FIG. 5 will be described with reference to FIGS. 15 and 16. In the following description, the same content with the example embodiment shown in FIG. 5 will not be repeatedly described.

Figure 15:
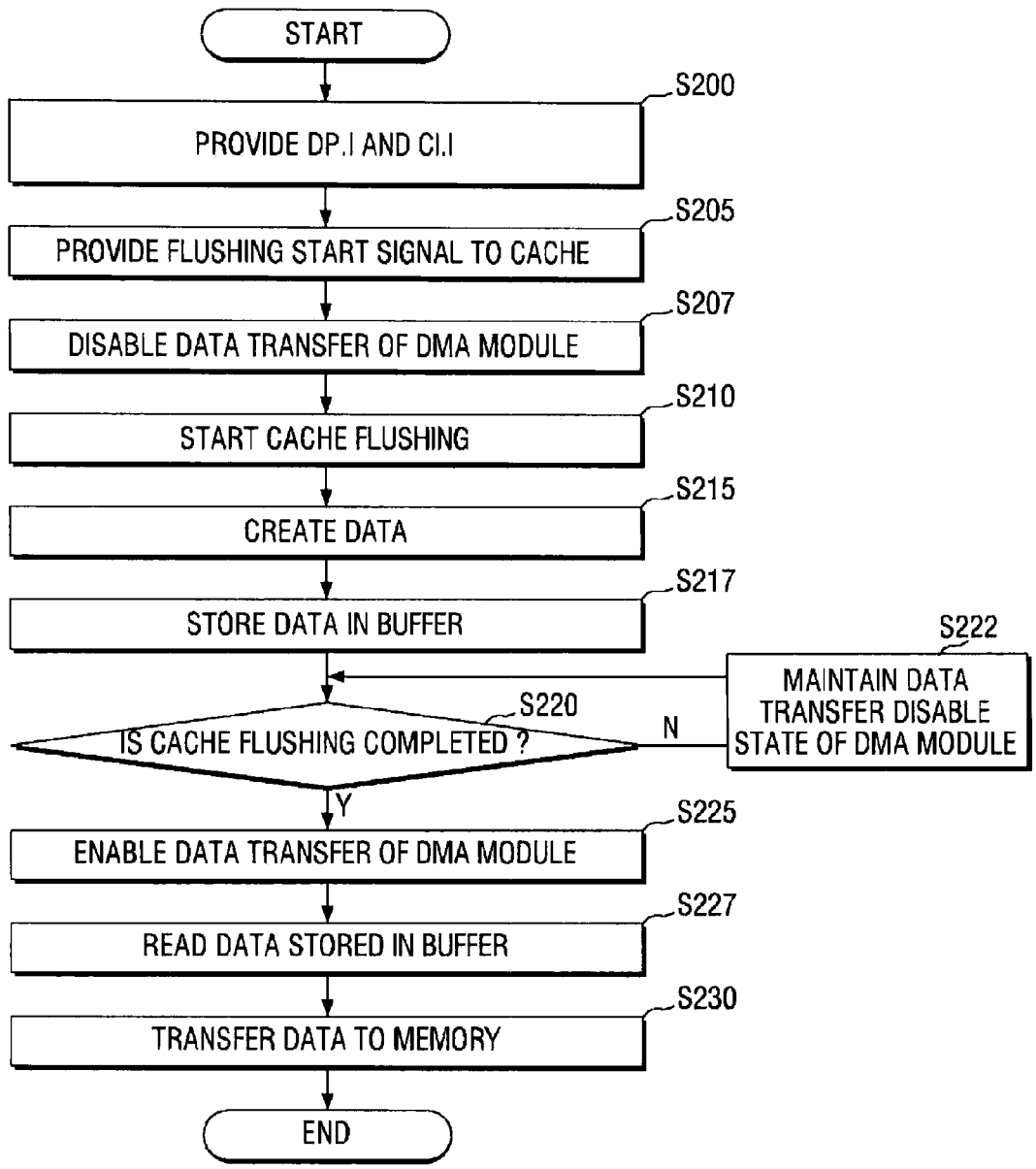
FIGS. 15 and 16 are diagrams illustrating an operating method of the semiconductor system shown in FIG. 5.
Figure 16:
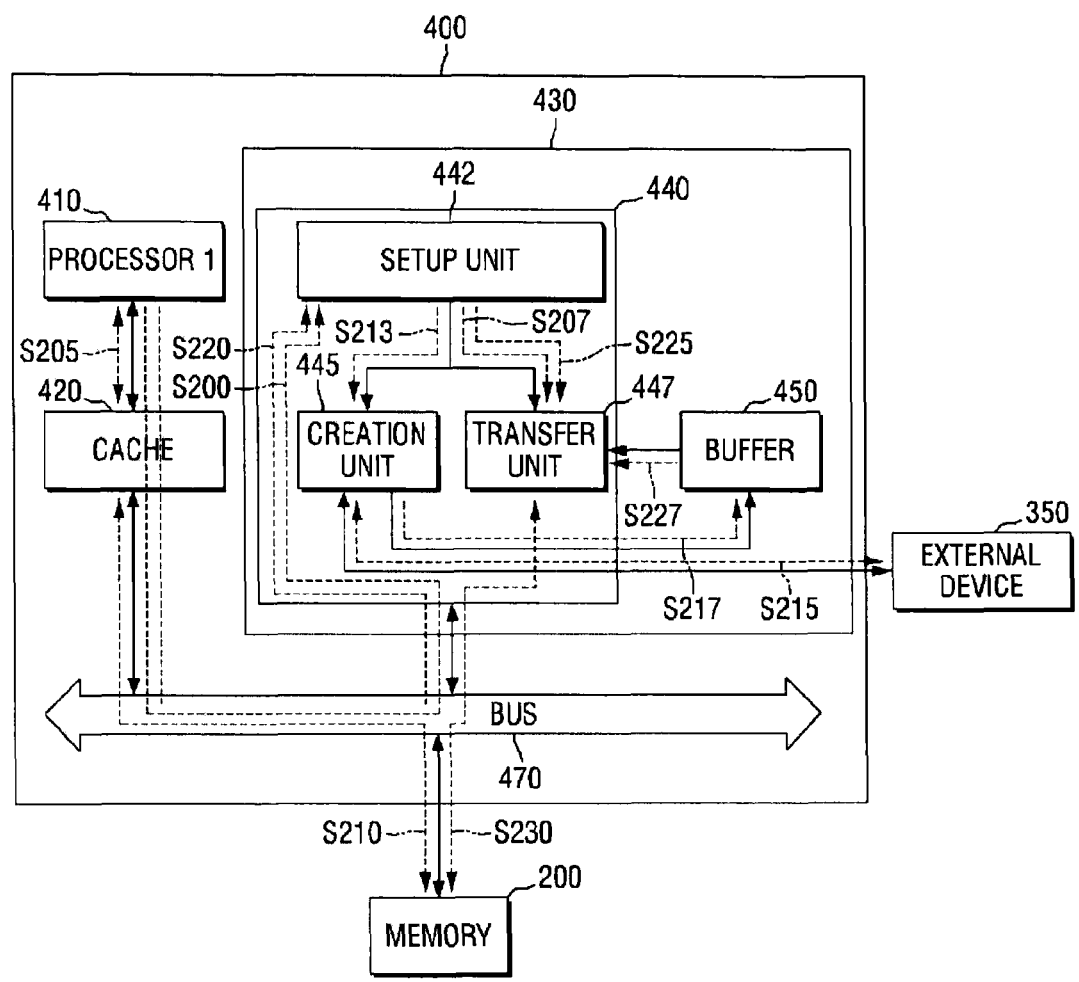

FIGS. 15 and 16 are diagrams illustrating an operating method of the semiconductor system shown in FIG. 5.

Referring to FIGS. 6, 15 and 16, first, data transfer parameter related information (DP.I) and cache flushing related information (CI.I) are provided (S200).

In detail, the setup unit 442 of the DMA module 440 of the second processor 430 may receive the data transfer parameter related information (DP.I) and the cache flushing related information (CI.I) from the first processor 410.

A flushing start signal is provided to the cache 420 (S205).

In detail, the first processor 410 may provide an invalidating (that is, flushing) start signal to the cache 420.

A data transfer operation of the DMA module 440 is disabled (S207).

In detail, the setup unit 442 may provide the cache flushing related information (CI.I) to the transfer unit 447. In addition, the transfer unit 447 may receive the cache flushing related information (CI.I) (e.g., information signaling that flushing of the cache 420 starts) to then be disabled.

The flushing of the cache 420 starts (S210).

In detail, the second data stored in the cache 420 (existing data, that is, non-updated data) may be flushed to a predetermined and/or selected address of the memory 200.

In the illustrated example embodiment, S200, S205, S207 and S210 are sequentially performed, but example embodiments are not limited thereto. That is to say, after the first processor 410 provides the flushing start signal to the cache 420 (S205), the data transfer parameter related information (DP.I) and the cache flushing related information (CI.I) may be provided to the setup unit 442 (S200).

Therefore, the transfer unit 447 (S207) may be disabled before the flushing of the cache 420 starts (S210), at the same time when the flushing of the cache 420 starts (S210) or after the flushing of the cache 420 starts (S210).

After the flushing of the cache 420 starts, the setup unit 442 may set the data transfer parameter DP based on the data transfer parameter related information (DP.I) received from the first processor 410. In addition, the setup unit 442 may set the data transfer parameter DP and may provide the same to the creation unit 445 (S213).

Then, data is created (S215).

In detail, the creation unit 445 may create first data (that is, updated data to be transferred to a predetermined and/or selected address of the memory 200) based on the received data transfer parameter DP. The creation unit 445 may directly create the first data in itself or may receive the first data from the external device 350.

The data is stored in the buffer 450 (S217).

In detail, the creation unit 445 may store the first data in an address of the buffer 450, pointed by the data transfer parameter DP.

If the flushing of the cache 420 is completed (S220), the first processor 410 may provide the cache flushing related information (CI.I) (e.g., information signaling that flushing of the cache 420 is completed) to the setup unit 442. However, if the flushing of the cache 420 is not completed, a disable state of the transfer unit 447 may be maintained (that is, a data transfer disable state of the DMA module 440 is maintained.)(S222).

The data transfer operation of the DMA module 440 is enabled (S225).

In detail, if the information signaling that flushing of the cache 420 is completed is received from the first processor 410, the setup unit 442 may provide the received information to the transfer unit 447.

The transfer unit 447 may receive the information signaling that flushing of the cache 420 is completed to then be enabled.

The data stored in the buffer 450 is read (S227).

In detail, the transfer unit 447 may read the first data stored in the buffer 450 based on the data transfer parameter DP.

The data is transferred to the memory 200 (S230).

In detail, the transfer unit 447 may transfer the first data to the predetermined and/or selected address of the memory 200 based on the data transfer parameter DP.

Hereinafter, an operating method of the semiconductor system shown in FIG. 7 will be described with reference to FIGS. 17 and 18. In the following description, the same content with the previous example embodiments will not be repeatedly described.

Figure 17:
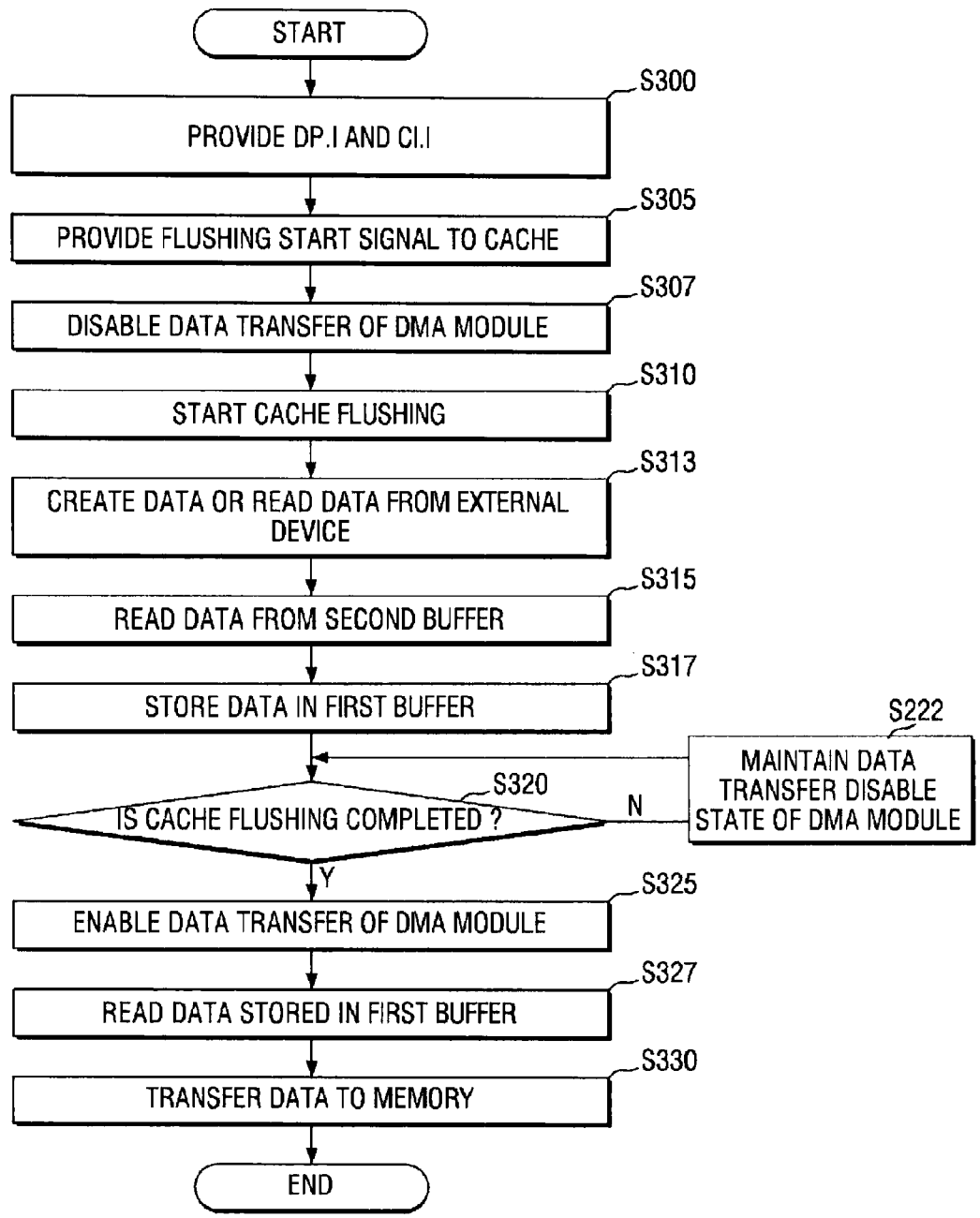
FIGS. 17 and 18 are diagrams illustrating an operating method of the semiconductor system shown in FIG. 7.
Figure 18:
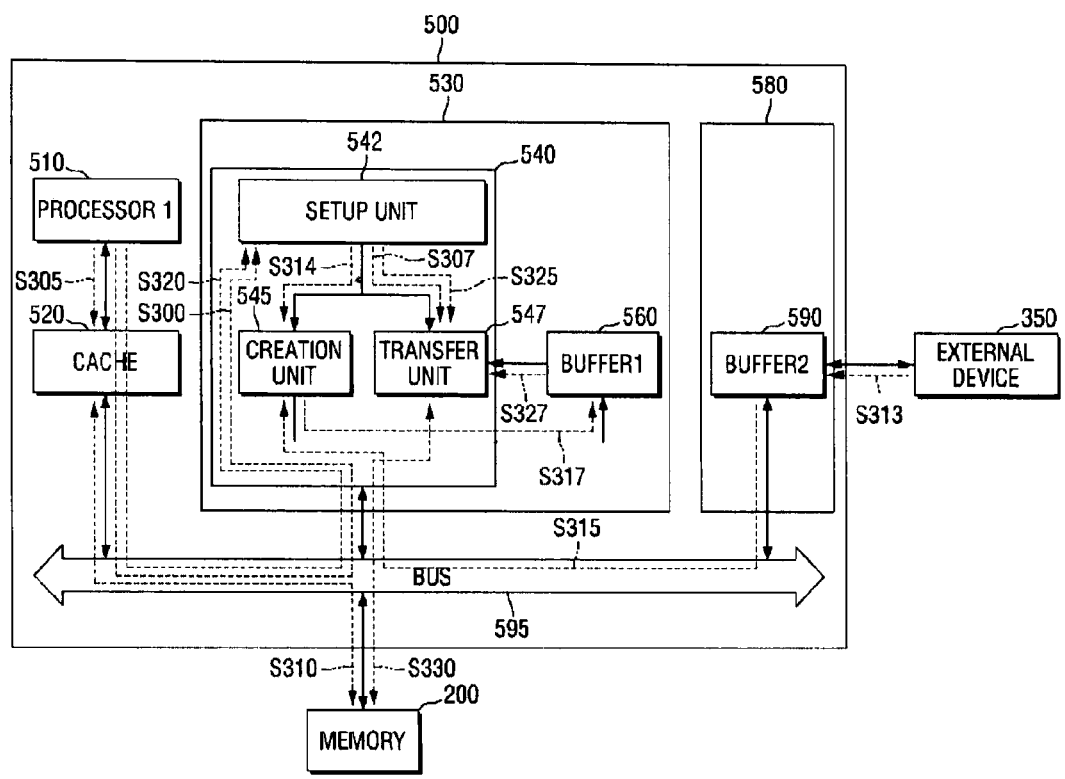

FIGS. 17 and 18 are diagrams illustrating an operating method of the semiconductor system shown in FIG. 7.

Referring to FIGS. 7, 17 and 18, first, data transfer parameter related information (DP.I) and cache flushing related information (CI.I) are provided (S300).

In detail, the setup unit 542 of the DMA module 540 of the second processor 530 may receive the data transfer parameter related information (DP.I) and the cache flushing related information (CI.I) from the first processor 510.

A flushing start signal is provided to the cache 520 (S305).

In detail, the first processor 510 may provide an invalidating (that is, flushing) start signal to the cache 520.

A data transfer operation of the DMA module 540 is disabled (S307).

In detail, the setup unit 542 may provide the cache flushing related information (CI.I) to the transfer unit 547. In addition, the transfer unit 547 may receive the cache flushing related information (CI.I) (e.g., information signaling that flushing of the cache 520 starts) to then be disabled.

The flushing of the cache 520 starts (S310).

In detail, the second data stored in the cache 520 (existing data, that is, non-updated data) may be flushed to a predetermined and/or selected address of the memory 200.

In the illustrated example embodiment, S300, S305, S307 and S310 are sequentially performed, but example embodiments are not limited thereto. That is to say, after the first processor 510 provides the flushing start signal to the cache 520 (S305), the data transfer parameter related information (DP.I) and the cache flushing related information (CI.I) may be provided to the setup unit 542 (S300).

Therefore, the transfer unit 547 (S307) may be disabled before the flushing of the cache 520 starts (S310), at the same time when the flushing of the cache 520 starts (S310) or after the flushing of the cache 520 starts (S310).

After the flushing of the cache 520 starts, the setup unit 542 may set the data transfer parameter DP based on the data transfer parameter related information (DP.I) received from the first processor 510. Although not shown, a third processor 580 may receive a data transfer parameter from the setup unit 542 and may receive first data from an external device 350 based on the received data transfer parameter or may directly create first data (S313).

The setup unit 542 may set the data transfer parameter DP and may provide the same to the creation unit 545 (S314).

In FIG. 18, the third processor 580 receiving the data transfer parameter from the setup unit 542 and creating the first data (S313) may be performed before the creation unit 545 receives the data transfer parameter DP from the setup unit 542 (S314), but example embodiments are not limited thereto.

That is to say, the creation unit 545 receiving the data transfer parameter DP from the setup unit 542 may be performed before the third processor 580 receives the data transfer parameter DP from the setup unit 542, at the same time when the third processor 580 receives the data transfer parameter DP from the setup unit 542 or after the third processor 580 receives the data transfer parameter DP from the setup unit 542.

The data is read from the second buffer 590 (S315).

In detail, the creation unit 545 may read the first data (that is, updated data to be transferred to a predetermined and/or selected address of the memory 200) from the second buffer 590 based on the received data transfer parameter DP. The creation unit 545 may directly create the first data in itself. However, for the sake of convenience, in the following description, it is assumed by way of example that the creation unit 545 receives first data stored in the second buffer 590.

The data is stored in the first buffer 560 (S317).

In detail, the creation unit 545 may store the first data in an address of the first buffer 560, pointed by the data transfer parameter DP.

If the flushing of the cache 520 is completed (S320), the first processor 510 may provide the cache flushing related information (CI.I) (e.g., information signaling that flushing of the cache 520 is completed) to the setup unit 542.

However, if the flushing of the cache 520 is not completed, a disable state of the transfer unit 547 may be maintained (that is, a data transfer disable state of the DMA module 540 is maintained)(S322).

A data transfer operation of the DMA module 540 is enabled (S325).

In detail, if the information signaling that flushing of the cache 520 is completed is received from the first processor 510, the setup unit 542 may provide the received information to the transfer unit 547.

The transfer unit 547 may receive the information signaling that flushing of the cache 520 is completed to then be enabled.

The data stored in the first buffer 560 is read (S327).

In detail, the transfer unit 547 may read the first data stored in the first buffer 560 based on the data transfer parameter DP.

The data is transferred to the memory 200 (S330).

In detail, the transfer unit 547 may transfer the first data to the predetermined and/or selected address of the memory 200 based on the data transfer parameter DP.

While at least some example embodiments have been particularly shown and described, it will be understood by those of ordinary skill in the art that various changes in form and details may be made therein without departing from the spirit and scope of example embodiment as defined by the following claims. It is therefore desired that example embodiments be considered in all respects as illustrative and not restrictive, reference being made to the appended claims rather than the foregoing description to indicate the scope of example embodiments.

What is claimed is:

1. A semiconductor device comprising:
a direct memory access (DMA) system configured to directly access a memory to write first data to an address of the memory, the DMA system including,
an initializer configured to set a data transfer parameter for writing the first data to the memory during a flushing period of second data from a cache to the address by a processor,
a creator configured to create the first data during the flushing period based on the set data transfer parameter, and
a transferer configured to write the first data to the address of the memory after the flushing period based on the data transfer parameter.

2. The semiconductor device of claim 1, wherein the first data is different from the second data.

3. The semiconductor device of claim 1, wherein the creator is configured to one of receive the first data from an external device and directly create the first data.

4. The semiconductor device of claim 3, wherein the creator is configured to perform at least one of a read operation and a write operation on the external device.

5. The semiconductor device of claim 1, further comprising:
a buffer configured to store the first data.

6. The semiconductor device of claim 5, wherein the creator is configured to store the first data in the buffer.

7. The semiconductor device of claim 6, wherein the transferer is configured to transfer the first data stored in the buffer to the memory.

8. The semiconductor device of claim 5, wherein the data transfer parameter includes a size of the first data, an address of the buffer storing the first data, and the address of the memory.

9. The semiconductor device of claim 1, wherein the initializer is configured to receive information related to the data transfer parameter and information related to flushing of the cache from the processor.

10. The semiconductor device of claim 9, wherein the transferer is configured to receive the information related to flushing of the cache from the initializer and be disabled during the flushing period.

11. A semiconductor device comprising:
a direct memory access (DMA) system configured to directly access a memory; and
a buffer configured to store first data and second data to be transferred to the memory, wherein the DMA system includes,
an initializer configured to set a data transfer parameter for transferring the first data and the second data to the memory during a flushing period of third data from a cache to a first address of the memory,
a creator configured to sequentially perform a first creation and a second creation, the creator configured to perform the first creation by creating the first data based on the data transfer parameter and storing the first data in the buffer during the flushing period and the creator configured to perform the second creation by creating the second data and storing the second data in the buffer, and
a transferer configured to sequentially perform a first transfer and a second transfer, the transferer configured to perform the first transfer such that the first data stored in the buffer is transferred to the first address of the memory after the flushing period and during the second creation based on the data transfer parameter, and the transferer configured to the second transfer such that the second data stored in the buffer is transferred to a second address of the memory.

12. A memory system comprising:
a memory;
a processor configured to flush first data in a cache to an address of the memory during a flushing period; and
a direct memory access system, the direct memory access system including,
an initializer configured to operate during the flushing period and create second data during the flushing period, and
a transferer configured to transfer the second data to the address of the memory outside of the flushing period.

13. The memory system of claim 12, wherein the initializer is configured to generate a data transfer parameter during the flushing period and the transferer is configured to transfer the second data based on the data transfer parameter.

14. The memory system of claim 13, wherein the transferer is configured to transfer the second data to the address after the flushing period.

15. The memory system of claim 12, wherein the memory system is configured to disable the transferer before the flushing period.

16. The memory system of claim 12, wherein the memory system is configured to enable the transferer when the flushing period ends.

17. The memory system of claim 12, wherein the memory comprises a three-dimensional memory array.

18. The memory system of claim 17, wherein the three-dimensional memory array comprises a non-volatile memory that is monolithically formed in one or more physical levels of memory cells having active areas disposed above a silicon substrate.

19. The memory system of claim 17, wherein the three-dimensional memory array comprises a plurality of memory cells, each of the memory cells including a charge trap layer.

20. The memory system of claim 17, wherein at least one of word lines and bit lines in the three-dimensional memory array are shared between levels.

* * * * *